US012629998B2

(12) United States Patent
Shi et al.

(10) Patent No.: US 12,629,998 B2
(45) Date of Patent: May 19, 2026

(54) INFLATABLE TOPPER STRUCTURE FOR PICKUP TRUCK BED

(71) Applicant: CHANGZHOU SUNWOOD INTERNATIONAL TRADING CO., LTD., Changzhou (CN)

(72) Inventors: Hang Shi, Changzhou (CN); Judy Wong, Changzhou (CN); Hongjuan Zheng, Changzhou (CN)

(73) Assignee: CHANGZHOU SUNWOOD INTERNATIONAL TRADING CO., LTD., Changzhou (CN)

( * ) Notice: Subject to any disclaimer, the term of this patent is extended or adjusted under 35 U.S.C. 154(b) by 364 days.

(21) Appl. No.: 18/520,603

(22) Filed: Nov. 28, 2023

(65) Prior Publication Data

US 2025/0135851 A1 May 1, 2025

(30) Foreign Application Priority Data

Oct. 26, 2023 (CN) .......................... 202322891242.1

(51) Int. Cl.
B60J 7/10 (2006.01)

(52) U.S. Cl.
CPC ..................................... B60J 7/104 (2013.01)

(58) Field of Classification Search
CPC ..... B60J 7/104; B60J 7/198; B60J 7/10; B60J 7/1291; B60J 7/141; B60J 7/102; B60J 7/12; B60J 7/1256; B60J 7/0092; B60P 7/0815; E04H 15/20
USPC ............ 296/100.01, 100.15, 100.16, 100.17, 296/100.18, 136.03, 37.6, 159, 163; 135/88.13
See application file for complete search history.

(56) References Cited

U.S. PATENT DOCUMENTS

| | | | | |
|---|---|---|---|---|
| 4,093,302 A | * | 6/1978 | Adams ...................... | B60P 3/34 |
| | | | | 296/100.18 |
| 4,296,960 A | * | 10/1981 | Winchester ............... | B60P 3/32 |
| | | | | 135/88.13 |
| 5,385,377 A | * | 1/1995 | Girard ...................... | B60J 7/104 |
| | | | | 296/108 |
| 5,692,795 A | * | 12/1997 | Mininger ................ | E04H 15/20 |
| | | | | 296/159 |
| 6,126,226 A | * | 10/2000 | Wheatley ................. | B60J 7/104 |
| | | | | 296/100.01 |

(Continued)

FOREIGN PATENT DOCUMENTS

| | | | |
|---|---|---|---|
| CN | 219856762 U | 10/2023 | |
| WO | WO-2008089531 A1 * | 7/2008 | .............. B60J 7/102 |

*Primary Examiner* — Amy R Weisberg
*Assistant Examiner* — Veronica M Condo
(74) *Attorney, Agent, or Firm* — Bayramoglu Law Offices

(57) ABSTRACT

An inflatable topper structure for a pickup truck bed is provided. The inflatable topper structure includes an inflatable topper body and a side bar structure for fixing the inflatable topper body to a pickup truck bed, where the side bar structure includes a first side bar and a second side bar; the first side bar is connected in a matched manner between a right side wall of the inflatable topper body and the pickup truck bed; the second side bar is connected in a matched manner between a left side wall of the inflatable topper body and the pickup truck bed; the first side bar and the second side bar are symmetrically arranged and each fixedly locked to the pickup truck bed; a top of each of the first side bar and the second side bar is provided with a groove.

7 Claims, 4 Drawing Sheets

(56)     References Cited

U.S. PATENT DOCUMENTS

| | | | | |
|---|---|---|---|---|
| 6,257,306 B1 * | 7/2001 | Weldy | ....................... | B60J 7/102 |
| | | | | 296/100.18 |
| 6,270,301 B1 * | 8/2001 | Dunlop | ................. | B60P 7/0815 |
| | | | | 410/104 |
| 6,435,586 B2 * | 8/2002 | Getzschman | ............. | B60R 9/00 |
| | | | | 224/543 |
| 6,499,791 B2 * | 12/2002 | Wheatley | ................. | B60J 7/102 |
| | | | | 296/100.18 |
| 6,669,264 B1 * | 12/2003 | Tucker | .................... | B60J 7/104 |
| | | | | 296/100.15 |
| 6,688,668 B2 * | 2/2004 | Stevens | .................... | B60J 7/104 |
| | | | | 296/100.18 |
| 6,821,067 B1 * | 11/2004 | Von Loehr | ........... | B60P 7/0815 |
| | | | | 410/97 |
| 6,905,162 B2 * | 6/2005 | Lester | .................... | B60J 7/102 |
| | | | | 296/100.18 |
| 10,611,219 B2 * | 4/2020 | Trinier | ................... | B60J 7/1614 |
| 11,976,487 B2 * | 5/2024 | Watts | ....................... | B60J 7/102 |
| 12,330,486 B2 * | 6/2025 | Flemming | ................. | B60P 3/34 |
| 2006/0017303 A1 * | 1/2006 | Weege | .................... | B60J 7/062 |
| | | | | 296/105 |
| 2006/0249984 A1 * | 11/2006 | Hale | ........................ | B60J 7/106 |
| | | | | 296/167 |

* cited by examiner

INFLATABLE TOPPER STRUCTURE FOR PICKUP TRUCK BED

CROSS REFERENCE TO THE RELATED APPLICATIONS

This application is based upon and claims priority to Chinese Patent Application No. 202322891242.1, filed on Oct. 26, 2023, the entire contents of which are incorporated herein by reference.

TECHNICAL FIELD

The present disclosure belongs to the technical field of automotive accessories, and in particular relates to an inflatable topper structure for a pickup truck bed.

BACKGROUND

With the rapid development of the national economy, people's income continues to increase, and automobiles are becoming increasingly popular as a means of transportation for people. As a type of passenger and commercial vehicles, pickup trucks are especially popular. Without an inflatable topper structure, original pickup truck beds on the market have limited storage space for goods and cannot prevent rain and moisture. As a result, they are easily worn, deformed, and rusted after long-term use. The inflatable topper structure emerges in response to these problems. However, the inflatable topper structure on the market has an incomplete structure and is unstable after being mounted on the pickup truck bed, resulting in an unsatisfactory usage effect and low performance. In view of this, there is an urgent need for an inflatable topper structure that is stable and convenient to assemble and disassemble.

SUMMARY

An objective of the present disclosure is to provide a simple, stable, reliable, convenient, and effective inflatable topper structure for a pickup truck bed. The present disclosure solves the problem that the existing inflatable topper structure has an incomplete structure and is unstable after being connected with a pickup truck bed.

To achieve the above objective, the present disclosure adopts the following technical solution. An inflatable topper structure for a pickup truck bed includes an inflatable topper body and a side bar structure for fixing the inflatable topper body to a pickup truck bed, where the side bar structure includes a first side bar and a second side bar; the first side bar is connected in a matched manner between a right side wall of the inflatable topper body and the pickup truck bed; and the second side bar is connected in a matched manner between a left side wall of the inflatable topper body and the pickup truck bed.

Preferably, the first side bar and the second side bar are symmetrically arranged and each fixedly locked to the pickup truck bed through a locking member.

Preferably, a top of each of the first side bar and the second side bar is provided with a groove that is matched with a bottom of the side wall of the inflatable topper body.

Preferably, an outer side of each of the first side bar and the second side bar is provided with a first clamping slot that is matched with a first clamping member located outside the side wall of the inflatable topper body.

Preferably, a front bar is provided between the first side bar and the second side bar; and the front bar is provided with a second clamping slot and a third clamping slot.

Preferably, the second clamping slot is connected in a matched manner with a second clamping member located at a front end of the inflatable topper body; and the third clamping slot is connected with an attachment through a third clamping member that is matched with the third clamping slot.

Preferably, the first side bar and the second side bar each are made of an aluminum profile or a plastic extrusion profile.

With the above technical solution after, the inflatable topper structure for a pickup truck bed provided by the present disclosure has the following beneficial effects:

In the present disclosure, through the side bar structure, the inflatable topper body is stably connected with the pickup truck bed, ensuring that the inflatable topper body is balanced and does not move during high-speed driving. The clamping members and clamping slots provided on the inflatable topper body and the side bar structure ensure stability and facilitate disassembly, improving disassembly efficiency. The attachment can be a storage bag or a bed fixing component, etc., further providing a storage function or other practical function. Therefore, the present disclosure has the advantages of simple structure, easy operation, high stability, good appearance consistency, and high convenience of disassembly and assembly. The present disclosure ensures the usage effect of the inflatable topper structure and improves the performance of the inflatable topper structure.

Figure 1:
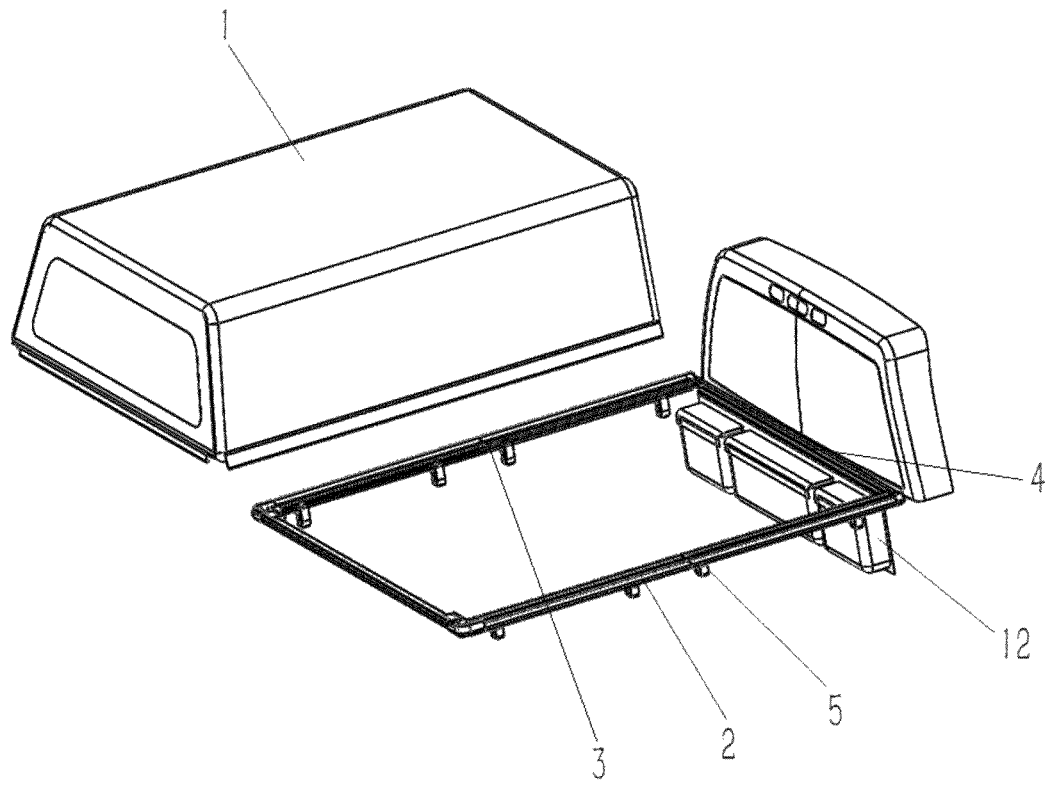
FIG. 1 is a structural diagram of an inflatable topper body and a side bar that are in a separated state according to the present disclosure.

Reference Signs: 1. inflatable topper body; 2. first side bar; 3. second side bar; 4. front bar; 5. locking member; 6. groove; 7. first clamping member; 8. first clamping slot; 9. second clamping slot; 10. third clamping slot; 11. second clamping member; 12. attachment; and 13. third clamping member.

DETAILED DESCRIPTION OF THE EMBODIMENTS

The following clearly and completely describes the technical solutions of the present disclosure with reference to accompanying drawings. Apparently, the described examples are merely some rather than all of the examples of the present disclosure. The following description of at least one exemplary embodiment is merely illustrative, and not intended to limit the present disclosure and application or use thereof in any way. All other embodiments obtained by those of ordinary skill in the art based on the embodiments of the present disclosure without creative efforts shall fall within the protection scope of the present disclosure.

It should be noted that the terminology used herein is for the purpose of describing particular embodiments only and is not intended to limit exemplary embodiments according to the present disclosure. As used herein, unless otherwise specified herein, the singular forms are also intended to include the plural forms. In addition, it should also be understood that when the terms "comprise" and/or "include" are used in this specification, they specify the presence of features, steps, operations, devices, components, and/or combinations thereof.

The relative arrangement of the components and steps, the numerical expressions and numerical values set forth in these embodiments do not limit the scope of the present disclosure unless specifically stated otherwise. Meanwhile, it should be understood that for ease of description, each portion in the drawings is not necessarily drawn to the actual scale. The technologies, methods, and equipment known to those of ordinary skill in the art may not be discussed in detail, but where appropriate, the technologies, methods, and equipment should be regarded as part of the authorized specification. In all examples shown and discussed herein, any specific value should be interpreted as merely exemplary, rather than restrictive. Therefore, other examples of the exemplary examples may have different values. It should be noted that similar reference signs and letters represent similar items in the drawings below. Therefore, once an item is defined in one drawing, it does not need to be further discussed in subsequent drawings.

It should be understood that in the description of the present disclosure, orientation terms such as "front", "rear", "upper", "lower", "left", "right", "transverse", "longitudinal", "vertical", "horizontal", "top" and "bottom" indicate orientation or position relationships based on the drawings. Unless otherwise specified, these orientation terms are merely intended to facilitate or simplify the description of the present disclosure, rather than to indicate or imply that the mentioned device or elements must have a specific orientation and must be constructed and operated in a specific orientation. Therefore, they should not be construed as a limitation to the protection scope of the present disclosure. The orientation terms "inner" and "outer" refer to the inner and outer parts relative to the contour of the mentioned component.

For ease of description, spatially relative terms, such as "above", "on the upper side of", "on the upper surface of" and "on", can be used to describe the spatial positional relationship between components or features shown in the figure. It should be understood that the spatially relative terms are intended to encompass different orientations of the components in use or operation in addition to those shown in the figure. For example, if a component in the figure is inverted, it is described as a component "above other component or structure" or "on other component or structure". Therefore, the component will be positioned as "below other component or structure" or "under other component or structure". Therefore, the exemplary term "above" may include both orientations "above" and "below". The component may also be positioned in other different ways (rotated by 90 degrees or in other orientations), but the relative description of the space should be explained accordingly.

In addition, it should be noted that the use of words such as "first" and "second" to define parts and components is only for the convenience of distinguishing corresponding parts and components. Unless otherwise stated, the above words have no special meaning, so they should not be construed as a limitation on the protection scope of the present disclosure.

Figure 2:
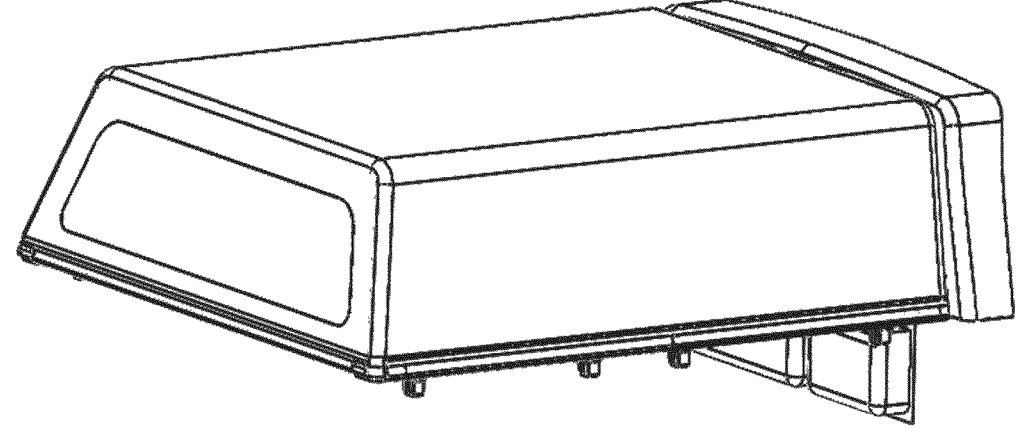
FIG. 2 is a structural diagram of the inflatable topper body and the side bar that are in an assembled state according to the present disclosure.
Figure 3:
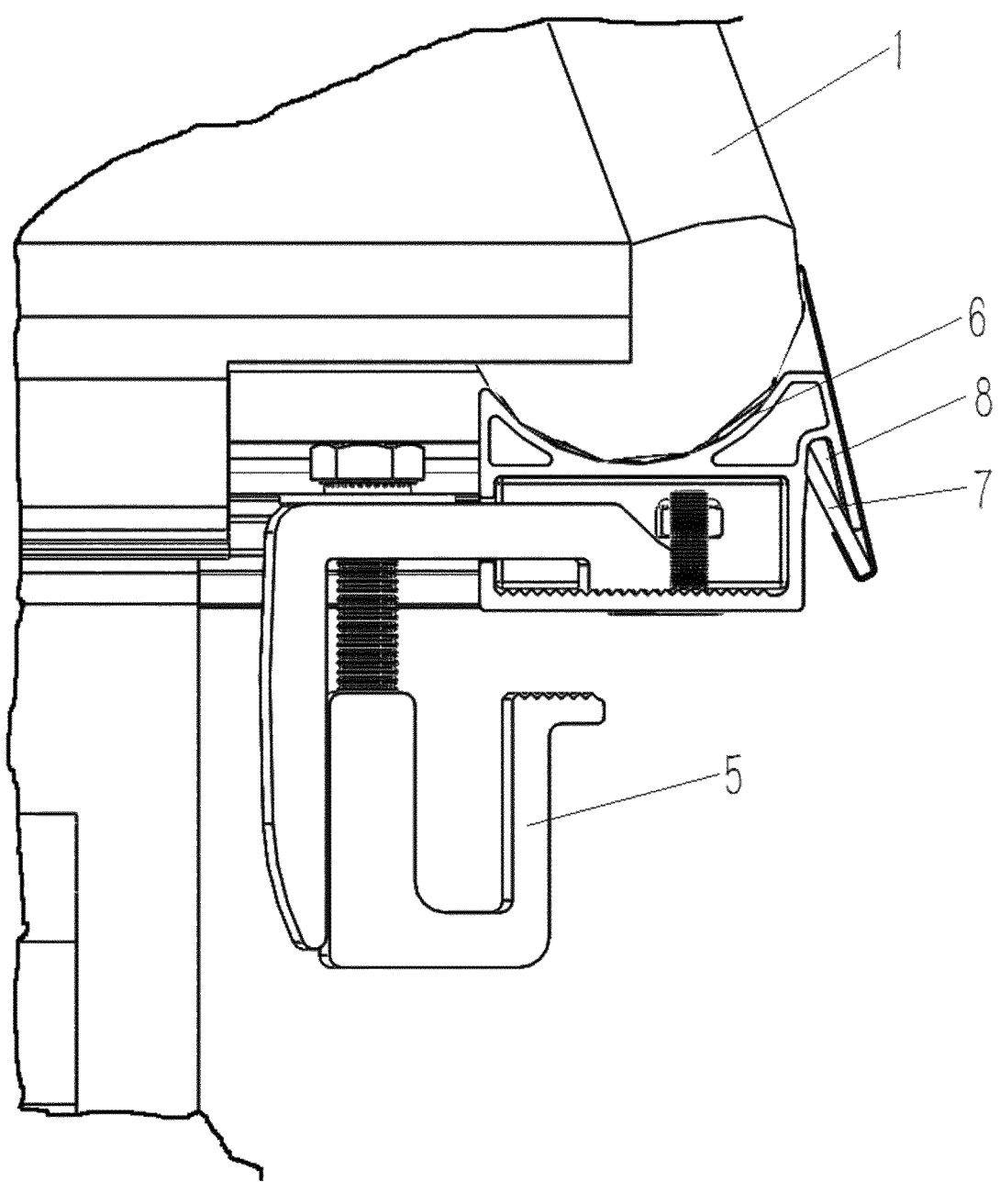
FIG. 3 is a structural diagram of a connection structure between the inflatable topper body and the side bar according to the present disclosure.
Figure 4:
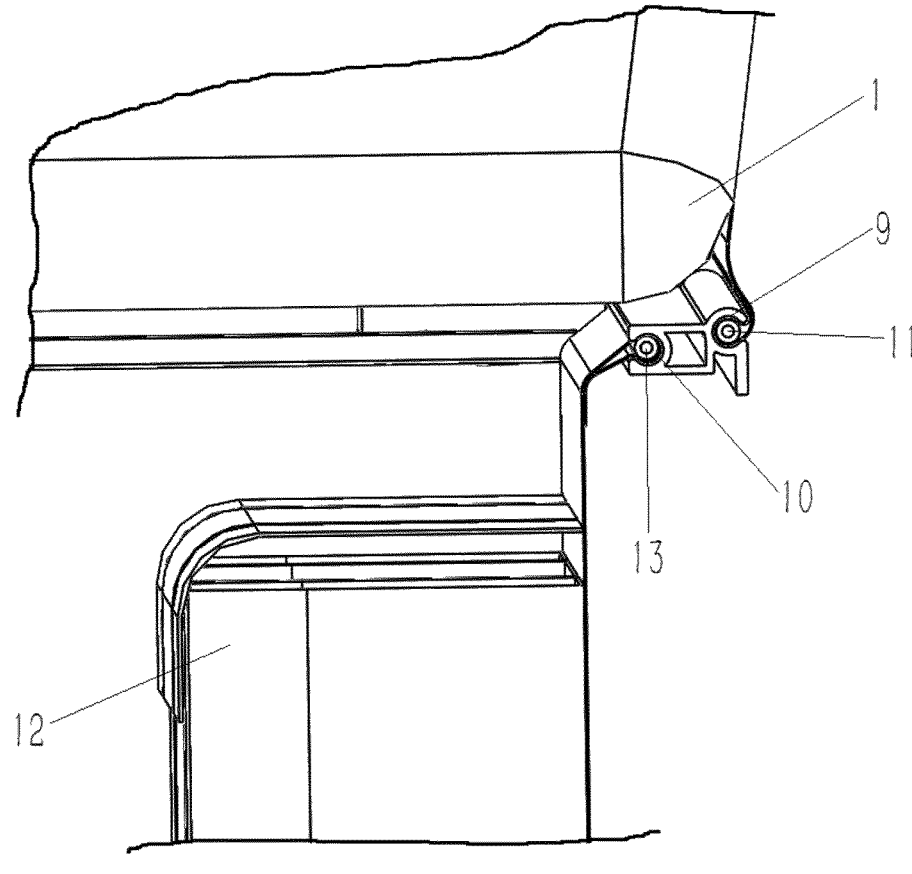
FIG. 4 is a structural diagram of a connection structure between a front bar and the inflatable topper body as well as an attachment according to the present disclosure.

The present disclosure provides an inflatable topper structure for a pickup truck bed. As shown in FIGS. 1 to 4, the inflatable topper structure includes inflatable topper body 1 and a side bar structure for fixing the inflatable topper body 1 to a pickup truck bed. The side bar structure includes first side bar 2 and second side bar 3. The first side bar 2 is connected in a matched manner between a right side wall of the inflatable topper body 1 and the pickup truck bed, and the second side bar 3 is connected in a matched manner between a left side wall of the inflatable topper body 1 and the pickup truck bed. Specifically, the first side bar 2 and the second side bar 3 are symmetrically arranged and each fixedly locked to the pickup truck bed through locking member 5.

Further, the right side wall of the inflatable topper body 1 is connected in a matched manner with the first side bar 2, and the left side wall of the inflatable topper body 1 is connected in a matched manner with the second side bar 3. Specifically, a top of each of the first side bar 2 and the second side bar 3 is provided with groove 6 that is matched with a bottom of the side wall of the inflatable topper body 1. In this way, the inflatable topper body 1 is stably connected with the pickup truck bed, ensuring that the inflatable topper body 1 is balanced and does not move during high-speed driving. An outer side of each of the first side bar 2 and the second side bar 3 is provided with first clamping slot 8 that is matched with first clamping member 7 located outside the side wall of the inflatable topper body 1. The design ensures stability and facilitates disassembly, improving disassembly efficiency. Front bar 4 is provided between the first side bar 2 and the second side bar 3. The front bar 4 is provided with second clamping slot 9 and third clamping slot 10. The second clamping slot 9 and the third clamping slot 10 are circular clamping slots. The second clamping slot 9 is connected in a matched manner with second clamping member 11 located at a bottom of a front end of the inflatable topper body 1. The design further ensures a stable connection between the inflatable topper body 1 and the pickup truck bed, ensuring that the inflatable topper body 1 is balanced and does not move during high-speed driving. The third clamping slot 10 is connected with attachment 12 through third clamping member 13 that is matched with the third clamping slot. The attachment 12 can be a storage bag, a bed fixing component, or other additional component. The design further provides a storage function or other practical function.

Further, the first side bar 2 and the second side bar 3 each are made of an aluminum profile or a plastic extrusion profile. The first clamping member 7, the second clamping member 11, and the third clamping member 13 are made of a plastic material. A soft polyvinyl chloride (PVC) material is provided between the inflatable topper body 1 and the first clamping member 7 as well as the second clamping member 11 and between the third clamping member 13 and the attachment 12. The soft PVC material includes one end compounded on the inflatable topper body 1 or the attachment 12 and the other end connected with the plastic clamping member. The design ensures stability, easy disassembly and assembly, and consistent appearance.

In summary, the inflatable topper structure for a pickup truck bed provided by the present disclosure has the advantages of simple structure, easy operation, high stability, good appearance consistency, and high convenience of disassembly and assembly. The inflatable topper structure ensures the usage effect of the inflatable topper structure and improves the performance of the inflatable topper structure, and has great market value, making it worthy of widespread promotion and application.

The above merely describes specific examples of the present disclosure, but the protection scope of the present disclosure is not limited thereto. A person skilled in the art can easily conceive modifications or replacements according to the technical solutions and ideas of the present disclosure within the technical scope of the present disclosure, and these modifications or replacements shall fall within the protection scope of the present disclosure.

What is claimed is:

1. An inflatable topper structure for a pickup truck bed, comprising:

an inflatable topper body; and a side bar structure for fixing the inflatable topper body to a pickup truck bed;

wherein the side bar structure comprises a first side bar and a second side bar that are configured to be arranged on right and left sides of the pickup truck bed;

wherein the first side bar is connected in a matched manner between a right side wall of the inflatable topper body and the pickup truck bed; and the second side bar is connected in a matched manner between a left side wall of the inflatable topper body and the pickup truck bed;

wherein a top of each of the first side bar and the second side bar is provided with a continuous groove extending along a longitudinal direction of the pickup truck bed, and an inflatable bottom portion of each of the right and left side walls of the inflatable topper body is received and retained within the corresponding groove;

wherein an outer side of each of the first side bar and the second side bar is provided with a first clamping slot that opens outwardly away from the inflatable topper body; and wherein a first clamping member is arranged in the first clamping slot and directly clamps the inflatable topper body against the corresponding side bar, such that the inflatable topper body is fixed on the pickup truck bed when the inflatable topper body is inflated.

2. The inflatable topper structure for the pickup truck bed according to claim 1, wherein the first side bar and the second side bar are symmetrically arranged and each fixedly locked to the pickup truck bed through a locking member.

3. The inflatable topper structure for the pickup truck bed according to claim 1, wherein the groove is matched with the inflatable bottom portion of each of the right and left side walls of the inflatable topper body.

4. The inflatable topper structure for the pickup truck bed according to claim 1, wherein the first clamping slot is matched with the first clamping member located outside each of the right and left side walls of the inflatable topper body.

5. The inflatable topper structure for the pickup truck bed according to claim 1, wherein a front bar is provided between the first side bar and the second side bar; and the front bar is provided with a second clamping slot and a third clamping slot.

6. The inflatable topper structure for the pickup truck bed according to claim 5, wherein the second clamping slot is connected in a matched manner with a second clamping member located at a front end of the inflatable topper body; and the third clamping slot is connected with an attachment through a third clamping member, wherein the third clamping member is matched with the third clamping slot.

7. The inflatable topper structure for the pickup truck bed according to claim 1, wherein the first side bar and the second side bar each are made of an aluminum profile or a plastic extrusion profile.

\* \* \* \* \*